(12) United States Patent
Suzaki et al.

(10) Patent No.: US 9,124,420 B2
(45) Date of Patent: Sep. 1, 2015

(54) ENCRYPTION PROCESSING DEVICE AND ENCRYPTION PROCESSING METHOD

(75) Inventors: Tomoyasu Suzaki, Tokyo (JP); Yukiyasu Tsunoo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 141 days.

(21) Appl. No.: 13/883,693

(22) PCT Filed: Nov. 14, 2011

(86) PCT No.: PCT/JP2011/076136
§ 371 (c)(1),
(2), (4) Date: May 6, 2013

(87) PCT Pub. No.: WO2012/067052
PCT Pub. Date: May 24, 2012

(65) Prior Publication Data
US 2013/0223624 A1 Aug. 29, 2013

(30) Foreign Application Priority Data
Nov. 15, 2010 (JP) ................. 2010-254804

(51) Int. Cl.
*H04L 9/08* (2006.01)
*H04L 9/06* (2006.01)

(52) U.S. Cl.
CPC ............ *H04L 9/0816* (2013.01); *H04L 9/0625* (2013.01)

(58) Field of Classification Search
None
See application file for complete search history.

(56) References Cited

U.S. PATENT DOCUMENTS

| 2002/0015492 | A1* | 2/2002 | Ohmori et al. .................. 380/37 |
| 2010/0266122 | A1 | 10/2010 | Suzaki et al. |
| 2011/0211688 | A1* | 9/2011 | Shirai et al. ..................... 380/28 |

FOREIGN PATENT DOCUMENTS

| JP | 2008-058826 A | 3/2008 |
| WO | 2009/075337 A1 | 6/2009 |

OTHER PUBLICATIONS

Taizo Shirai, et al., "Hardware Implementations of the 128-bit Blockcipher CLEFIA", IEICE Technical Report, Jul. 2007, pp. 29-36, vol. 107, No. 141.

(Continued)

*Primary Examiner* — David Le
(74) *Attorney, Agent, or Firm* — Sughrue Mion, PLLC (57) ABSTRACT

A transposition processing unit having a k-partition generalized Feistel structure transposes $Y_{b,u}$ into $Z_{a,t}$ if $Y_{a,t}$ ($t=0, 1, \ldots, s-1$) is transposed into $Z_{b,u}$ ($u=0, 1, \ldots, s-1$, $u \neq t$), in a case where input data entered into the transposition processing unit is $Y_0, Y_1, \ldots, Y_{k-1}$ (n bits×k); output data from the transposition processing unit is $Z_0, Z_1, \ldots, Z_{k-1}$; $Y_i$ ($i=0, 1, \ldots, k-1$) divided into s blocks ($s=2, 4, \ldots, n$) is $Y_{i,0}, Y_{i,1}, \ldots, Y_{i,s-1}$; $Z_i$ divided into s blocks is $Z_{i,0}, Z_{i,1}, \ldots, Z_{i,s-1}$.

8 Claims, 11 Drawing Sheets

(56) References Cited

OTHER PUBLICATIONS

Tomoyasu Suzaki et al, "Improving the Generalized Feistel", LNCS, Fast Software Encryption, Feb. 2010, pp. 19-39, vol. 6147.

Tomoyasu Suzaki et al., "On New Design That Combines Diffusion Layer With Generalized Feistel Structure", The 2008 Symposium on Cryptography and Information Security, Jan. 2008, pp. 1-6.

Yuliang Zheng et al., "On the Construction of Block Ciphers Provably Secure and Not Relying on Any Unproved Hypotheses", Advances in Cryptology, CRYPTO 1989, LNCS 435, 1990, pp. 461-480, vol. 435.

* cited by examiner

ENCRYPTION PROCESSING DEVICE AND ENCRYPTION PROCESSING METHOD

CROSS-REFERENCE TO RELATED APPLICATIONS

This application is a National Stage Entry of PCT/JP2011/076136 filed Nov. 14, 2011, which is based upon and claims the benefit of the priority of Japanese patent application No. 2010-254804 filed on Nov. 15, 2010, the disclosures of all of which are incorporated herein in their entirety by this reference thereto.

TECHNICAL FIELD

The present invention relates to an encryption processing device and encryption processing method, and particularly to an encryption processing device and encryption processing method that conceal or decrypt data based on a common key block cipher when communicating or storing the data.

BACKGROUND

Common key block cipher is known as a technology that conceals communication data or accumulated data. A block cipher encrypts data to be encrypted by dividing the data into a predetermined unit called block length. DES (Data Encryption Standard), proposed in the 1970s, is a typical block cipher. DES employs a Feistel structure as the structure of its data randomizing unit.

Figure 4:
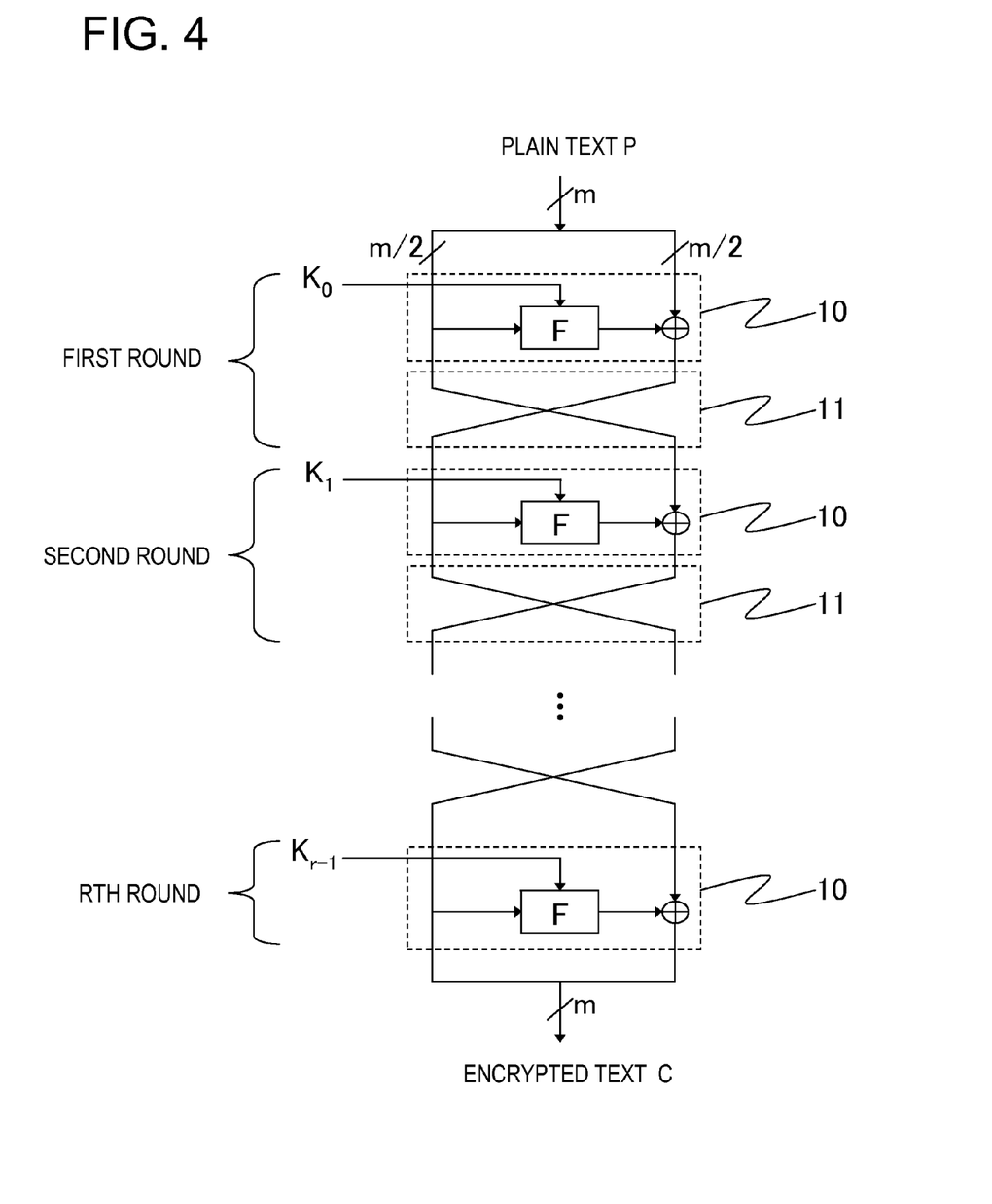
FIG. 4 is a drawing showing an encryption process having an r-round Feistel structure.

FIG. 4 is a drawing showing an encryption process using an r-round Feistel structure that generates an m-bit encrypted text C from an m-bit plain text P. One round of processing in the Feistel structure includes an F function processing unit 10 and a transposition processing unit 11. The F function processing unit 10 receives two pieces of m/2-bit data and key data $K_i$, outputs one of the pieces of data as it is, performs an exclusive OR ("+" symbols in circle in FIG. 4; referred to as "XOR" hereinafter) between data obtained by performing conversion of an F function on one of the pieces of data using the key data $K_i$ and the other piece of the data, and outputs the result. The transposition processing unit 11 shuffles the two pieces of data received and outputs them. Only in the final r-th round, the transposition processing unit 11 does not perform its processing and only the processing by the F function processing unit 10 is performed.

Figure 5:
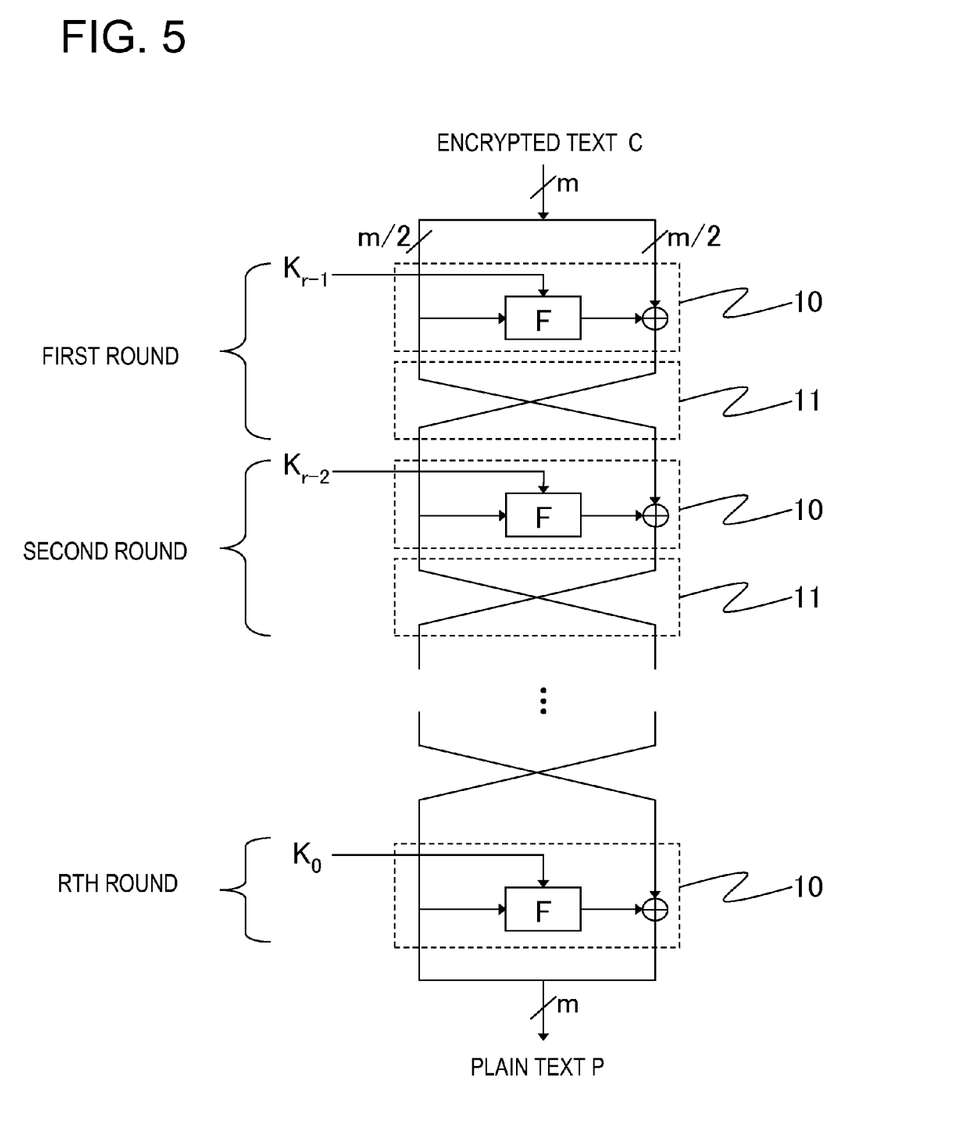
FIG. 5 is a drawing showing a decryption process having the r-round Feistel structure.

FIG. 5 is a drawing showing a decryption process corresponding to the encryption process in FIG. 4. The decryption process in FIG. 5 includes the same F function processing unit 10 and transposition processing unit 11 as the encryption process in FIG. 4. Decryption of the Feistel structure can be done by performing the encryption process in the reverse order (going back from the bottom in FIG. 4).

Both the F function processing unit 10 and the transposition processing unit 11 have a vertically symmetrical structure. Further, the encryption process in FIG. 4 and the decryption process in FIG. 5 have a vertically symmetrical structure as a whole. Therefore, just by reversing the order of use of the used key data in each round, both encryption and decryption become possible. As described, according to DES, the encryption process and the decryption process can share the round processing, and the implementation scale can be reduced, compared with the SPN (Substitution Permutation Network) structure, represented by AES (Advanced Encryption Standard).

Further, generalized Feistel structure, in which the number of blocks of the Feistel structure is expanded to two or more, is known (Non Patent Literature 1). In Non Patent Literature 1, the generalized Feistel structure is referred to as Feistel-Type Transformation (FTT). Non Patent Literature 1 proposes three kinds of structures from Type-1 to Type-3, however, only Type-2 will be described here. Unless stated otherwise, the "generalized Feistel structure" refers to Type-2 generalized Feistel structure hereinafter.

Figure 6:
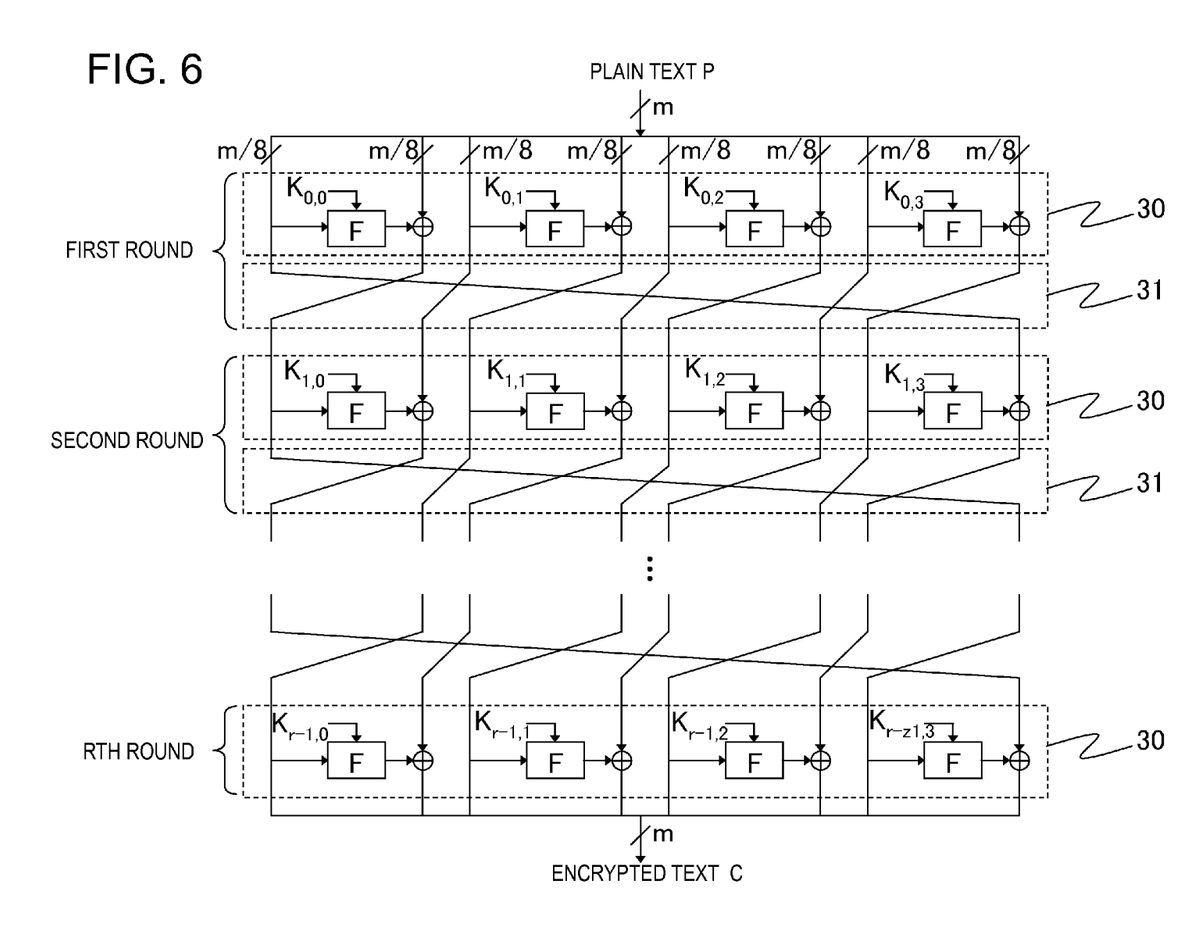
FIG. 6 is a drawing showing a round of an encryption process having an eight-partition generalized Feistel structure.

FIG. 6 is a drawing showing an example of a generalized Feistel structure. The drawing shows an encryption process having a generalized Feistel structure dividing data into eight blocks. One round of processing in the generalized Feistel structure includes an F function processing unit 30 and a transposition processing unit 31. The F function processing unit 30 comprises four F function processing units 10 in parallel. In a case of k-partitions, the F function processing unit 30 is generally constituted by k/2 F function processing units 10 in parallel. The F function processing unit 30 performs conversion of an F function on four sets of data, in which eight pieces of m/8-bit data are paired, and outputs eight pieces of data. The transposition processing unit 31 cyclically shifts the eight pieces of data to the left. Only in the final r-th round, the transposition processing unit 31 does not perform its processing and only the processing by the F function processing unit 30 is performed.

Further, Japanese Patent Application 2009-246306 proposes a generalized Feistel structure in which the transposition processing unit 31 performs a transposition process other than cyclic shift.

Figure 7:
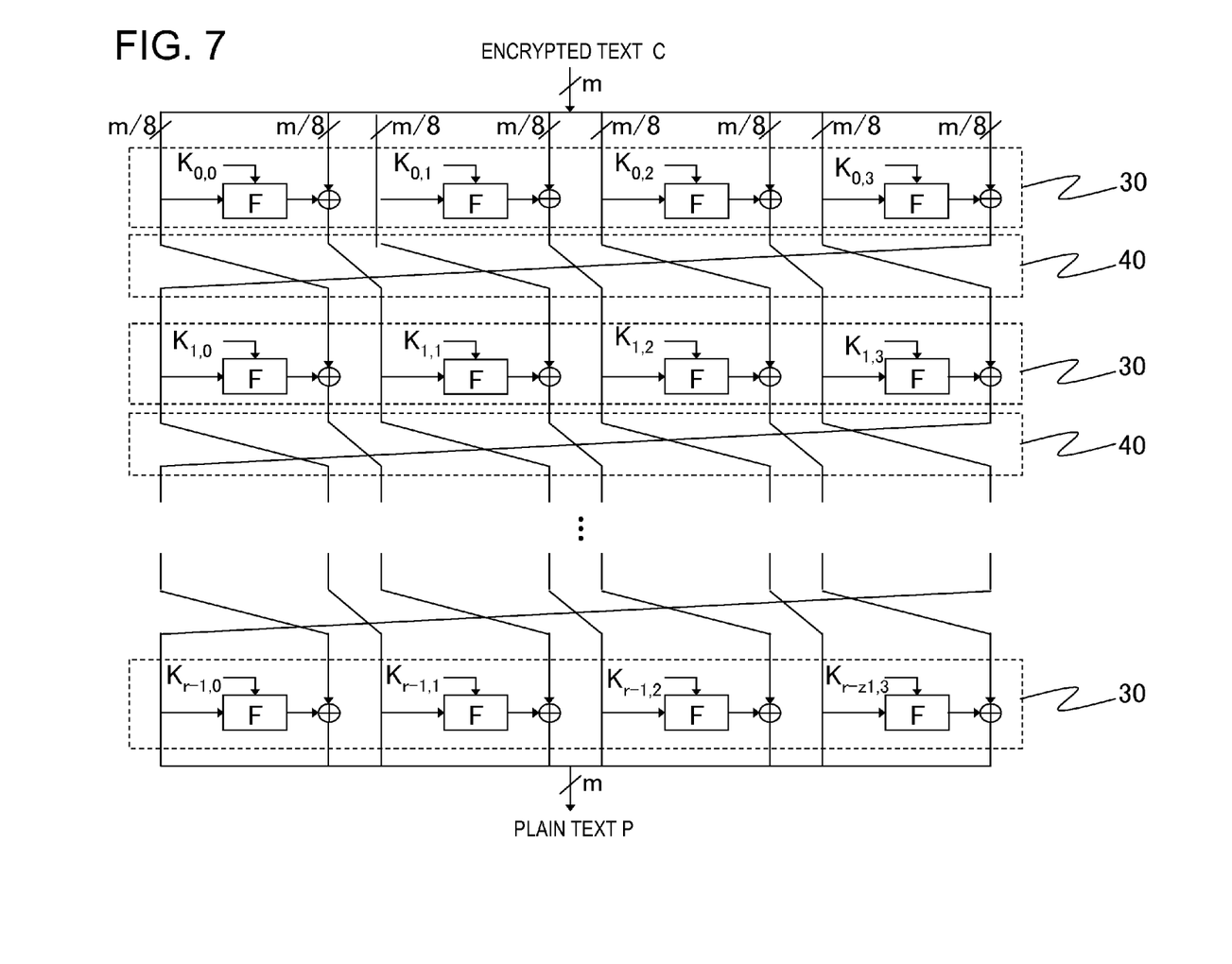
FIG. 7 is a drawing showing a round of a decryption process having the eight-partition generalized Feistel structure.

FIG. 7 is a drawing showing a decryption process corresponding to the encryption process in FIG. 6. An F function processing unit 30 in the decryption process and the F function processing unit 30 in the encryption process are identical. However, a transposition processing unit 40 is obtained by turning the transposition processing unit 31 upside down; therefore, the transposition processing unit 40 and the transposition processing unit 31 in the encryption process are different.

As described, in the Feistel structure, the encryption process and the decryption process can share the F function processing unit 10 and the transposition processing unit 11. On the other hand, the encryption process and the decryption process cannot share the same transposition processing unit in the generalized Feistel structure.

As an example, Patent Literature (PTL) 1 describes a structure in which an encryption function and a decryption function are shared in an extended Feistel type common key block cipher.

PTL 1:
Japanese Patent Kokai Publication No. JP2008-058826A
NPL 1:
Y. Zheng, T. Matsumoto, H. Imai, "On the Construction of Block Ciphers Provably Secure and Not Relying on Any Unproved Hypotheses," CRYPTO 1989, LNCS vol. 435, pp. 461-480, Springer-Verlag, 1990.

SUMMARY

Each disclosure of Patent Literature and Non Patent Literature (NPL) listed above is incorporated herein in its entirety by reference thereto. The following analysis is given by the present invention.

A method for implementing the encryption process above into hardware will be described. Examples of devices used for hardware implementation include a dedicated LSI (Large Scale Integration) and FPGA (Field-Programmable Gate Array).

Figure 8:
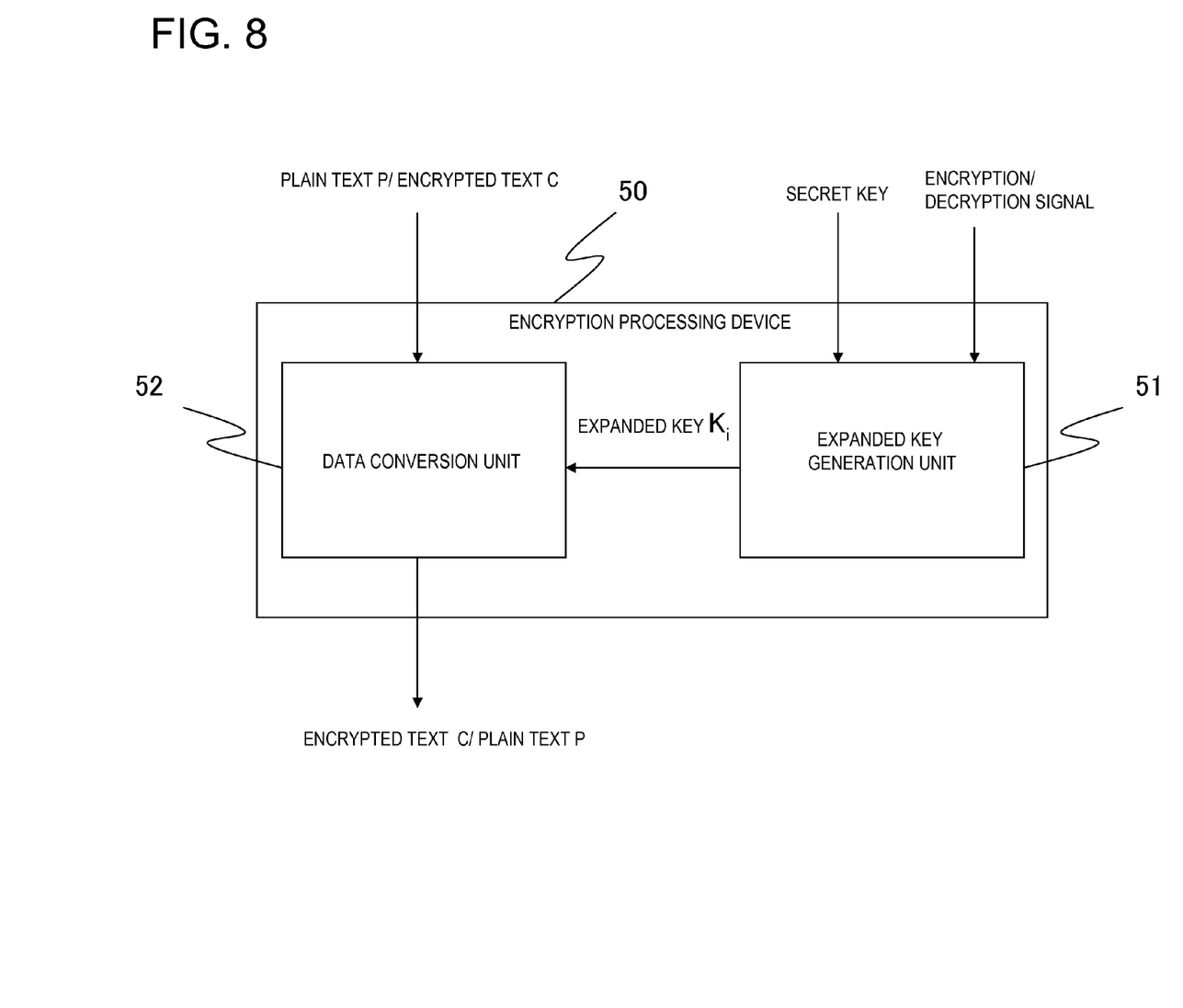
FIG. 8 is a block diagram showing the configuration of an encryption device using a Feistel structure.

FIG. 8 is a block diagram illustrating a configuration of an encryption device as an example when a Feistel structure is used for an encryption process. With reference to FIG. 8, an encryption processing device 50 comprises an expanded key generation unit 51 and a data conversion unit 52.

The expanded key generation unit 51 generates an expanded key $K_i$ from a secret key supplied externally and sends the generated key to the data conversion unit 52. Further, the expanded key generation unit 51 generates an encryption or decryption expanded key according to an encryption/decryption signal supplied externally.

The data conversion unit 52 receives a plain text P (or encrypted text C), performs encryption processing (or decryption processing) using the expanded key data received from the expanded key generation unit 51, generates an encrypted text C (or plain text P), and outputs the result.

Figure 9:
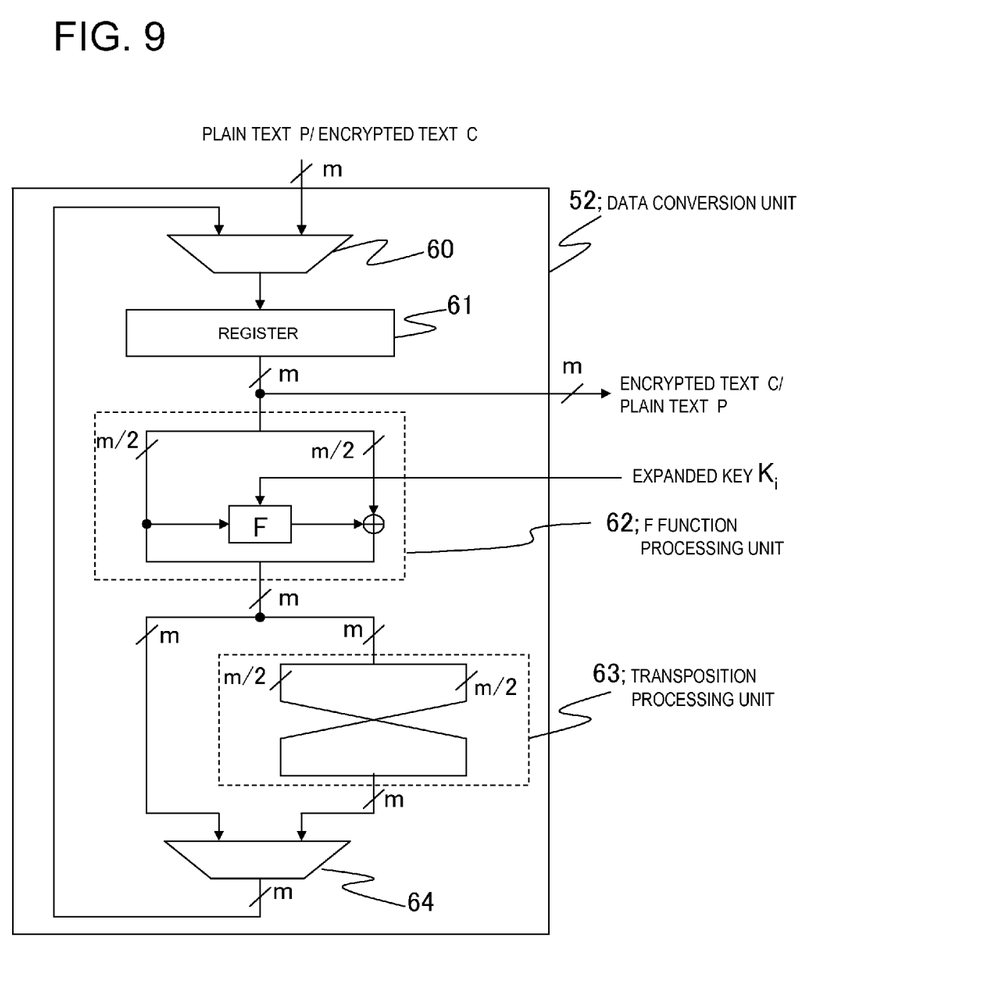
FIG. 9 is a drawing showing a data path when a Feistel structure is implemented as hardware.

FIG. 9 is a drawing showing details of the data conversion unit 52. With reference to FIG. 9, the data conversion unit 52 comprises selectors 60 and 64, a register 61, an F function processing unit 62, and a transposition processing unit 63. Note that the purpose of FIG. 9 is to show a data path of a round of an encryption process and a control unit for a loop (round) process is omitted. A flow from an input of the plain text P (or the encrypted text C) to an output of the encrypted text C (or the plain text P) will be described with reference to FIG. 9.

The received plain text P (or the encrypted text C) is stored in the register 61 via the selector 60. When an encryption (or decryption) process starts, the selector 60 selects the plain text P (or the encrypted text C). Meanwhile, when a round process starts, the selector 60 selects output data from the selector 64. The following process is repeated until a specified number of rounds is reached.

The data stored in the register 61 is converted by the F function processing unit 62 using the expanded key data $K_i$. M-bit data outputted from the F function processing unit 62 is diverged into two branches. One of the branches of the m-bit data is supplied to the selector 64 as it is. The other branch of the m-bit data is divided by the transposition processing unit 63 into m/2-bit data, which are shuffled and supplied to the selector 64. The selector 64 selects one of the two inputs according to round information (not shown in the drawing). From a first round to an (r−1)-th round, the selector 64 selects the output data from the transposition processing unit 63 and supplies it to the selector 60. Meanwhile, in the processing of an r-th round, the selector 64 selects the output data from the F function processing unit 62 and supplies it to the selector 60. One round of processing corresponds to a process from when the data in the register 61 is read to when it is written back.

Figure 10:
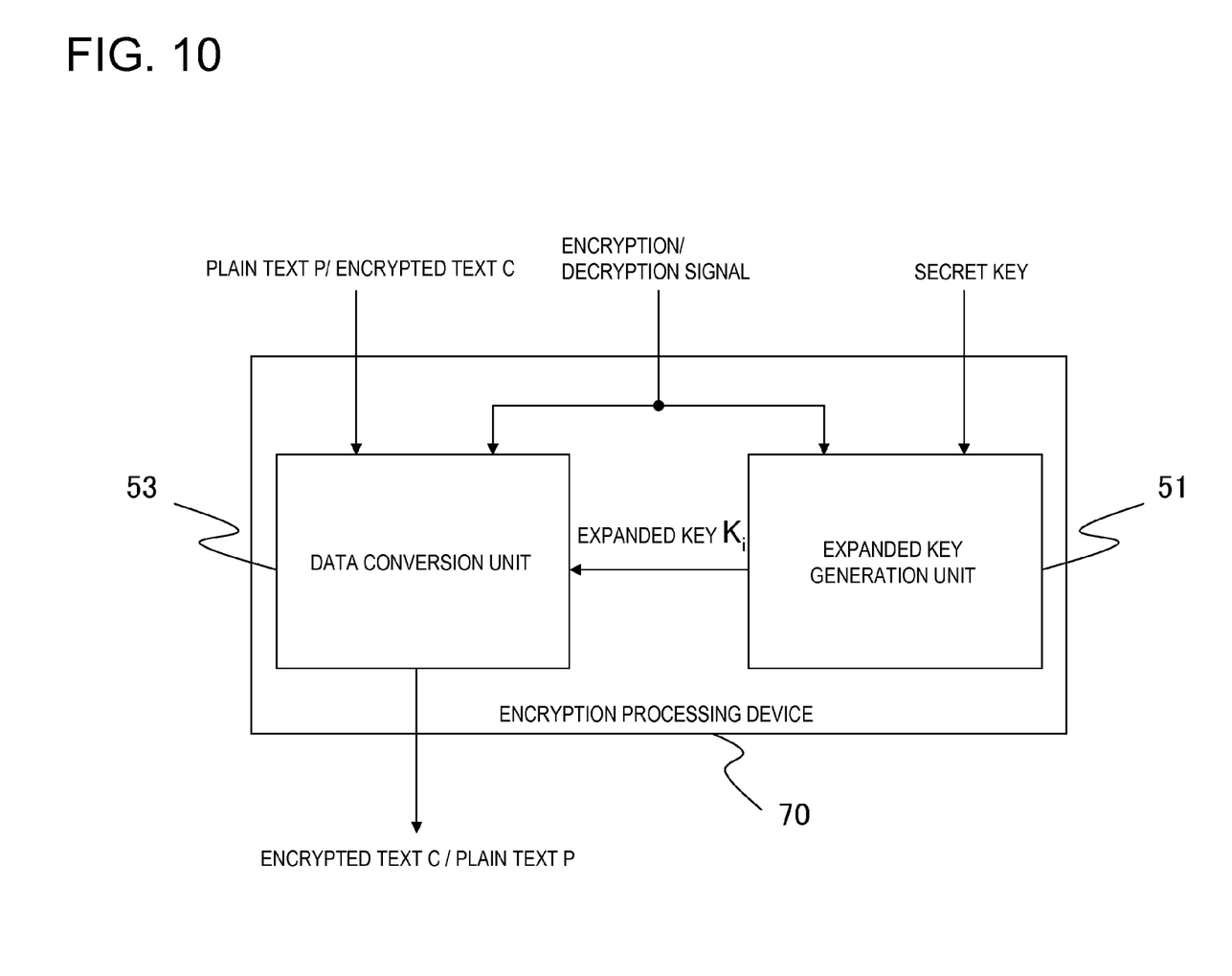
FIG. 10 is a block diagram showing the configuration of an encryption device using a generalized Feistel structure.

Meanwhile FIG. 10 is a block diagram illustrating the configuration of an encryption device as an example when a generalized Feistel structure is used for an encryption process. With reference to FIG. 10, an encryption processing device 70 comprises the expanded key generation unit 51 and a data conversion unit 53. The encryption processing device 70 differs from the encryption processing device 50 in FIG. 8 in that the encryption/decryption signal is also supplied to the data conversion unit 53.

Figure 11:
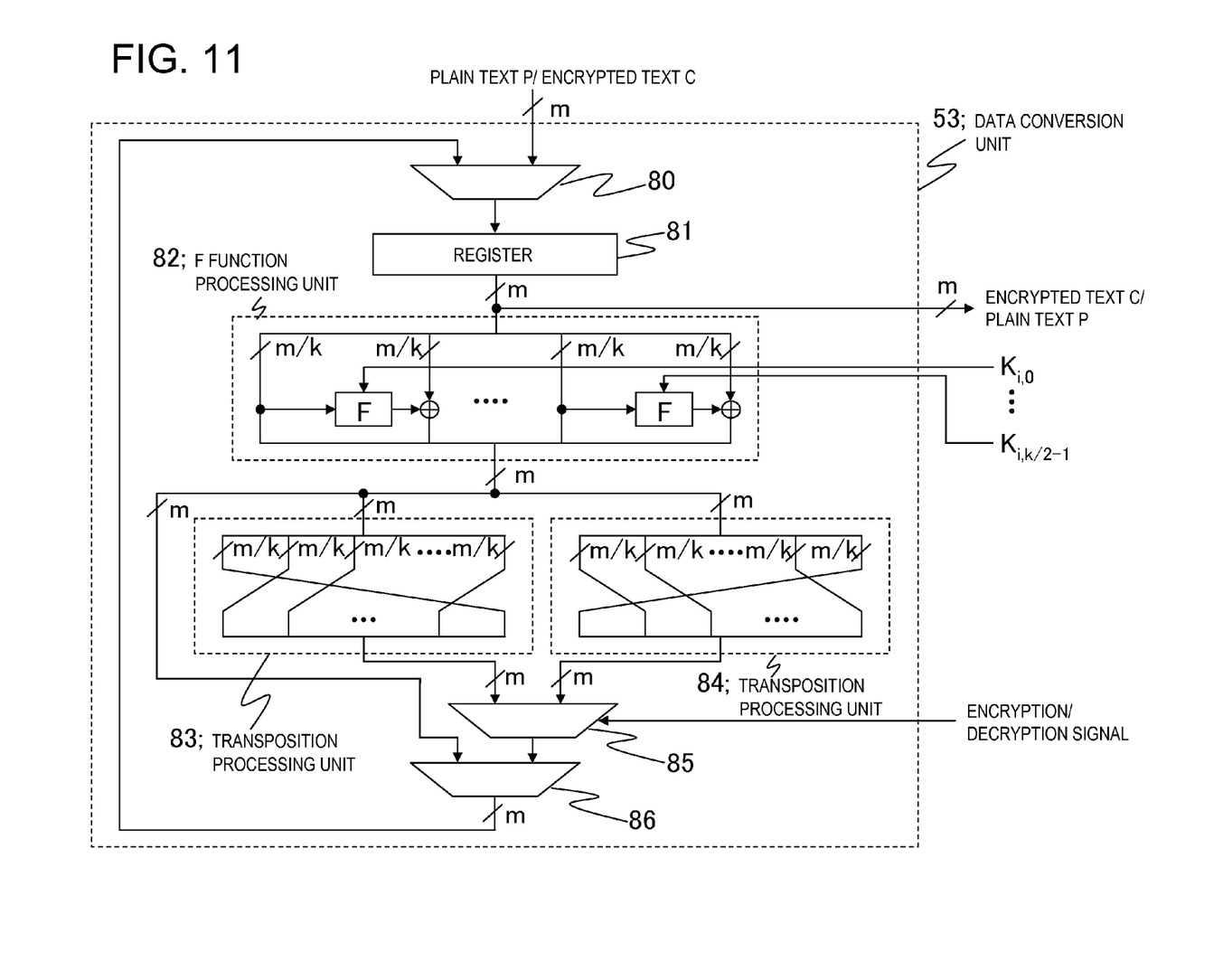
FIG. 11 is a drawing showing a data path when a generalized Feistel structure is implemented as hardware.

FIG. 11 is a drawing showing details of the data conversion unit 53. With reference to FIG. 11, the data conversion unit 53 comprises selectors 80, 85, and 86, a register 81, an F function processing unit 82, and transposition processing units 83 and 84. Here, the differences between the data conversion unit 53 shown in FIG. 11 and the data conversion unit 52 shown in FIG. 9 will be explained. Since a generalized Feistel structure is employed, the transposition processing unit 83 for encryption and the transposition processing unit 84 for decryption are needed. In this case, the selector 85 is required that selects an output from the transposition processing unit 83 or 84 depending on whether an encryption or decryption process is performed. Each bit of m-bit data outputted from the F function processing unit 82 is diverged into three branches. The first m-bit data is supplied to the selector 86 as it is, the second m-bit data is supplied to the transposition processing unit 83, and the third m-bit data is supplied to the transposition processing unit 84. The selector 85 selects data outputted from either the transposition processing unit 83 or 84 according to the encryption/decryption signal supplied externally, and outputs the data to the selector 86.

As described, encryption and decryption processes can share transposition processing in a Feistel structure. On the other hand, since transposition processing for encryption and transposition processing for decryption cannot be communalized in a generalized Feistel structure, the selector 85 that switches between encryption and decryption is required. As a result, a generalized Feistel structure increases the hardware implementation scale. Further, the selector 85 does not contribute to the strength of encryption. Therefore, the processing by the selector 85 is wasteful when promoting to reduce the scale.

Further, in the encryption processing device described in Patent Literature 1, swap processing can be shared due to the replacement of a round key. However, in order to replace the round key, processing for recognizing whether encryption or decryption processing is performed and for determining whether or not the key should be replaced is required. This means that the switching processing is simply moved to a key schedule (i.e., a function that generates the round key from a secret key), and it is difficult to reduce the hardware implementation according to the encryption processing device described in Patent Literature 1.

Therefore, there is a need in the art to provide an encryption processing device and encryption processing method that can be implemented in a small scale and requiring no selector for switching between the transposition processing unit for encryption and the transposition processing unit for decryption by having encryption and decryption processes share a transposition processing unit while taking advantage of the benefits of miniaturizing the F function processing unit when a generalized Feistel structure is employed.

According to a first aspect of the present invention, there is provided an encryption processing device, comprising:

an F function processing unit that divides (m×k)-bit input data into k blocks (m and k are both even numbers) of m-bit words (referred to as "word" hereinafter) $x_0, x_1, \ldots, x_{k-2}, x_{k-1}$, and that outputs as a word $Y_{i+1}$ (i=0, 2, . . . , k−2) a word obtained as a result of an operation between the word $x_{i+1}$ and a result of an operation of an F-function using key data on the word $x_i$, while outputting the word $x_i$ as a word $Y_i$; and a transposition processing unit that divides the word $Y_i$ (i=0, 1, . . . , k−1) into s blocks (s=2, 4, . . . , m) of sub-words $Y_{i,0}, Y_{i,1}, \ldots, Y_{i,s-1}$, transposes a sub-word $Y_{i, w[x]}$ into a sub-word $Z_{px[i], w[y]}$ with a transposition condition Px (x=1, 2, . . . , s/2−1) and a transposition condition Qx (x=1, 2, . . . , s/2−1), transposes a sub-word $Y_{i, w[y]}$ into a sub-word $Z_{qx[i], w[x]}$, and that outputs a word $Z_{i, 0} Z_{i, 1} \ldots Z_{i, s-1}$ as an i-th word, wherein the transposition condition Px=(px[0], px[1], px[2], . . . , px[k−1]) transposes an i-th sub-word into a px[i]-th sub-word where px[i]≠px[j] if i≠j, the transposition condition Qx=(qx[0], qx[1], qx[2], ..., qx[k−1]) transposes an i-th sub-word into a qx[i]-th sub-word where qx[i]≠qx[j] if i≠j, qx[px[i]]=i, and the w[t](t=0, 1, ..., s−1) is w[t]∈{0, 1, 2, ..., s−1} where w[t]≠w[T] if t≠T.

According to a second aspect of the present invention, there is provided an encryption processing device, based on a k-partition generalized Feistel structure, comprising:

a transposition processing unit that transposes $Y_{b,u}$ into $Z_{a,t}$ if $Y_{a,t}$ (t=0, 1, ..., s−1) is transposed into $Z_{b,u}$ (u=0, 1, ..., s−1, u≠t), in a case where input data is $Y_0, Y_1, ..., Y_{k−1}$ (n bits×k), output data is $Z_0, Z_1, ..., Z_{k−1}$, $Y_i$ (i=0, 1, ..., k−1) divided into s blocks (s=2, 4, ..., n) is $Y_{i,0}, Y_{i,1}, ..., Y_{i,s−1}$, and $Z_i$ divided into s blocks is $Z_{i,0}, Z_{i,1}, ..., Z_{i,s−1}$.

According to a third aspect of the present invention, there is provided an encryption processing method, comprising:

dividing (m×k)-bit input data into k blocks (m and k are both even numbers) of m-bit words (referred to as "word" hereinafter) $x_0, x_1, ..., x_{k−2}, x_{k−1}$, and obtaining as a word $Y_{i+1}$ (i=0, 2, ..., k−2) a word obtained as an operation between the word $x_{i+1}$ and a result of an operation of an F function using key data on the word $x_i$ while deeming the word $x_i$ as a word $Y_i$; and dividing the word $Y_i$ (i=0, 1, ..., k−1) into s blocks (s=2, 4, ..., m) of sub-words $Y_{i,0}, Y_{i,1}, ..., Y_{i,s−1}$, transposing a sub-word $Y_{i,w[x]}$ into a sub-word $Z_{px[i],w[y]}$ with a transposition condition Px (x=1, 2, ..., s/2−1) and a transposition condition Qx (x=1, 2, ..., s/2−1), transposing a sub-word $Y_{i,w[y]}$ into a sub-word $Z_{qx[i],w[x]}$, and deeming a word $Z_{i,0} Z_{i,1} ... Z_{i,s−1}$ as an i-th word, wherein the transposition condition Px=(px[0], px[1], px[2], ..., px[k−1]) transposes an i-th sub-word into a px[i]-th sub-word where px[i]≠px[j] if i≠j, the transposition condition Qx=(qx[0], qx[1], qx[2], ..., qx[k−1]) transposes an i-th sub-word into a qx[i]-th sub-word where qx[i]≠qx[j] if i≠j, qx[px[i]]=i, and the w[t] t=0, 1, ..., s−1) is w[t]∈{0, 1, 2, ..., s−1} where w[t]≠w[T] if t≠T.

According to a fourth aspect of the present invention, there is provided an encryption processing method, based on a k-partition generalized Feistel structure, comprising:

transposing $Y_{b,u}$ into $Z_{a,t}$ if $Y_{a,t}$ (t=0, 1, ..., s−1) is transposed into $Z_{b,u}$ (u=0, 1, ..., s−1, u≠t), in a case where input data is $Y_0, Y_1, ..., Y_{k−1}$ (n bits×k), output data is $Z_0, Z_1, ..., Z_{k−1}$, $Y_i$ (i=0, 1, ..., k−1) divided into s blocks (s=2, 4, ..., n) is $Y_{i,0}, Y_{i,1}, ..., Y_{i,s−1}$, and $Z_i$ divided into s blocks is $Z_{i,0}, Z_{i,1}, ..., Z_{i,s−1}$.

The present invention provides the following advantage, but not restricted thereto. According to the encryption processing device and encryption processing method of the present invention, there can be provided an encryption processing device that can be implemented in a small scale and requiring no selector for switching between a transposition processing unit for encryption processing and a transposition processing unit for decryption processing by having the encryption and decryption processing share a transposition processing unit while taking advantage of the benefits of miniaturizing an F function processing unit when a generalized Feistel structure is employed.

PREFERRED MODES

In the present disclosure, there are various possible modes, which include the following, but not restricted thereto. First, a summary of the present disclosure is given. Note that the drawing reference signs used in the summary are given solely to facilitate understanding and not to limit the present invention to the illustrated aspects.

Figure 1:
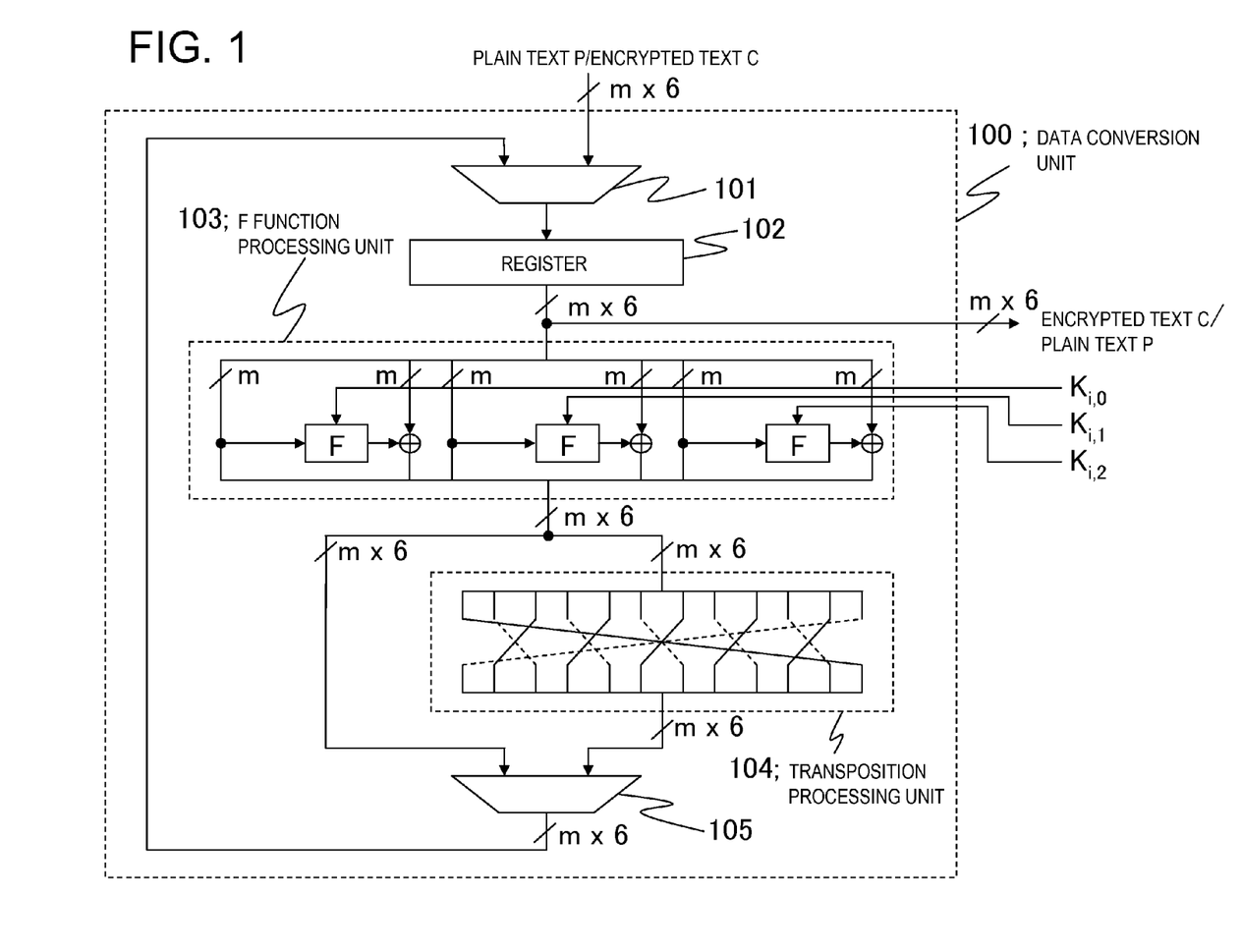
FIG. 1 is a drawing showing a data path when a generalized Feistel structure to which a transposition process of the present disclosure is applied is implemented as hardware.

With reference to FIG. 1, an encryption processing device of the present disclosure comprises an F function processing unit (103) that divides (m×k)-bit input data into k blocks (m and k are both even numbers) of m-bit words (referred to as "word" hereinafter) $x_0, x_1, ..., x_{k−2}, x_{k−1}$, and that outputs as a word $Y_{i+1}$ (i=0, 2, ..., k−2) a word obtained as a result of an operation between the word $x_{i+1}$ and a result of an operation of an F function using key data on the word $x_i$ while outputting the word $x_i$ as a word $Y_i$; and a transposition processing unit (104) that divides the word $Y_i$ (i=0, 1, ..., k−1) into s blocks (s=2, 4, ..., m) of sub-words $Y_{i,0}, Y_{i,1}, ..., Y_{i,s−1}$, transposes a sub-word $Y_{i,w[x]}$ into a sub-word $Z_{px[i],w[y]}$ with a transposition condition Px (x=1, 2, ..., s/2−1) and a transposition condition Qx (x=1, 2, ..., s/2−1), transposes a sub-word $Y_{i,w[y]}$ into a sub-word $Z_{qx[i],w[x]}$ and that outputs a word $Z_{i,0}, Z_{i,1} ... Z_{i,s−1}$ as an i-th word.

The encryption processing device encrypts or decrypts (m×k)-bit data by repeating a predetermined number of rounds of supplying an (m×k)-bit plain text or encrypted text to the F function processing unit (103), supplying an output thereof to the transposition processing unit (104), and supplying an output thereof to the F function processing unit (103) again, finally performing F function processing, and by deeming an output thereof as an encrypted text or plain text.

Here, the transposition condition Px=(px[0], px[1], px[2], ..., px[k−1]) transposes an i-th sub-word into a px[i]-th sub-word, and px[i]≠px[j] if i≠j. Further, the transposition condition Qx=(qx[0], qx[1], qx[2], ..., qx[k−1]) transposes the i-th sub-word into a qx[i]-th sub-word, and qx[i]≠qx[j] if i≠j. Further, qx[px[i]]=i. Moreover, w[t] (t=0, 1, ..., s−1) is w[t]∈{0, 1, 2, ..., s−1}, and w[t]≠w[T] if t≠T.

Further, with reference to FIG. 1, the encryption processing device may further comprise a first selector (105) that receives outputs from the F function processing unit (103) and the transposition processing unit (104), selects and outputs an output from the transposition processing unit (104) while the predetermined number of rounds are repeated, and that selects and outputs an output from the F function processing unit (103) at all other times; and a second selector (101) that receives the plain text or encrypted text and an output from the first selector (105), selects and outputs the plain text or encrypted text before the repetition of the predetermined number of rounds starts, and that selects and outputs an output from the first selector (105) at all other times. In this case, the F function processing unit (103) receives the output from the second selector (101).

This encryption processing device does not require a selector for switching between a transposition processing unit for encryption and a transposition processing unit for decryption because encryption and decryption processes share the transposition processing unit (104) while taking advantage of the benefits of miniaturizing the F function processing unit when a generalized Feistel structure is employed. Therefore, according to this encryption processing device, a small-scale implementation is possible.

In the present disclosure, the following modes are possible.

[Mode 1]

An encryption processing device may be the encryption processing device relating to the first aspect.

[Mode 2]

An encryption processing device may be the encryption processing device relating to the second aspect.

[Mode 3]

An encryption processing device may further comprise:
an F function processing unit that divides (m×k)-bit input data into k blocks (m and k are both even numbers) of m-bit words (referred to as "word" hereinafter) $x_0, x_1, \ldots, x_{k-2}, x_{k-1}$, and that outputs as a word $Y_{i+1}$ a word obtained as a result of an operation between the word $x_{i+1}$ (i=0, 2, ..., k-2) and a result of an operation of an F function using key data on the word $x_i$ while outputting the word $x_i$ as a word $Y_i$.

[Mode 4]

An encryption processing device may be configured to encrypt or decrypt (m×k)-bit data by repeating a predetermined number of rounds of supplying an (m×k)-bit plain text or encrypted text to the F function processing unit, supplying an output thereof to the transposition processing unit, and supplying an output thereof to the F function processing unit again, finally performing F function processing, and by deeming an output thereof as an encrypted text or a plain text.

[Mode 5]

An encryption processing device may further comprise:
a first selector that receives outputs from the F function processing unit and the transposition processing unit, selects and outputs an output from the transposition processing unit while the predetermined number of rounds are repeated, and that selects and outputs an output from the F function processing unit at all other times; and
a second selector that receives the plain text or encrypted text and an output from the first selector, selects and outputs the plain text or encrypted text before the repetition of the predetermined number of rounds starts, and that selects and outputs an output from the first selector at all other times, wherein
the F function processing unit receives an output from the second selector.

[Mode 6]

An encryption processing method may be the encryption processing method relating to the third aspect.

[Mode 7]

An encryption processing method may be the encryption processing method relating to the fourth aspect.

(First Exemplary Embodiment)

An encryption processing device relating to a first exemplary embodiment will be described in detail with reference to the drawings. In the present exemplary embodiment, a configuration of the encryption processing device is as shown in the block diagram in FIG. 8 as an example.

FIG. 1 is a drawing showing the configuration when a data conversion unit 100 in the encryption processing device of the present exemplary embodiment is implemented as hardware. In other words, the data conversion unit 100 in FIG. 1 corresponds to the data conversion unit 52 in the encryption processing device 50 in FIG. 8 in the present exemplary embodiment. With reference to FIG. 1, the data conversion unit 100 comprises selectors 101 and 105, a register 102, a F function processing unit 103, and a transposition processing unit 104.

The procedure in which the data conversion unit 100 generates the encrypted text C (or the plain text P) from the plain text P (or the encrypted text C) is the same as the procedure by the data conversion unit 52 shown in FIG. 9. The F function processing unit 103 corresponds to a case where the F function processing unit 82 has a six-partition structure in the data conversion unit 53 shown in FIG. 11.

Figure 2:
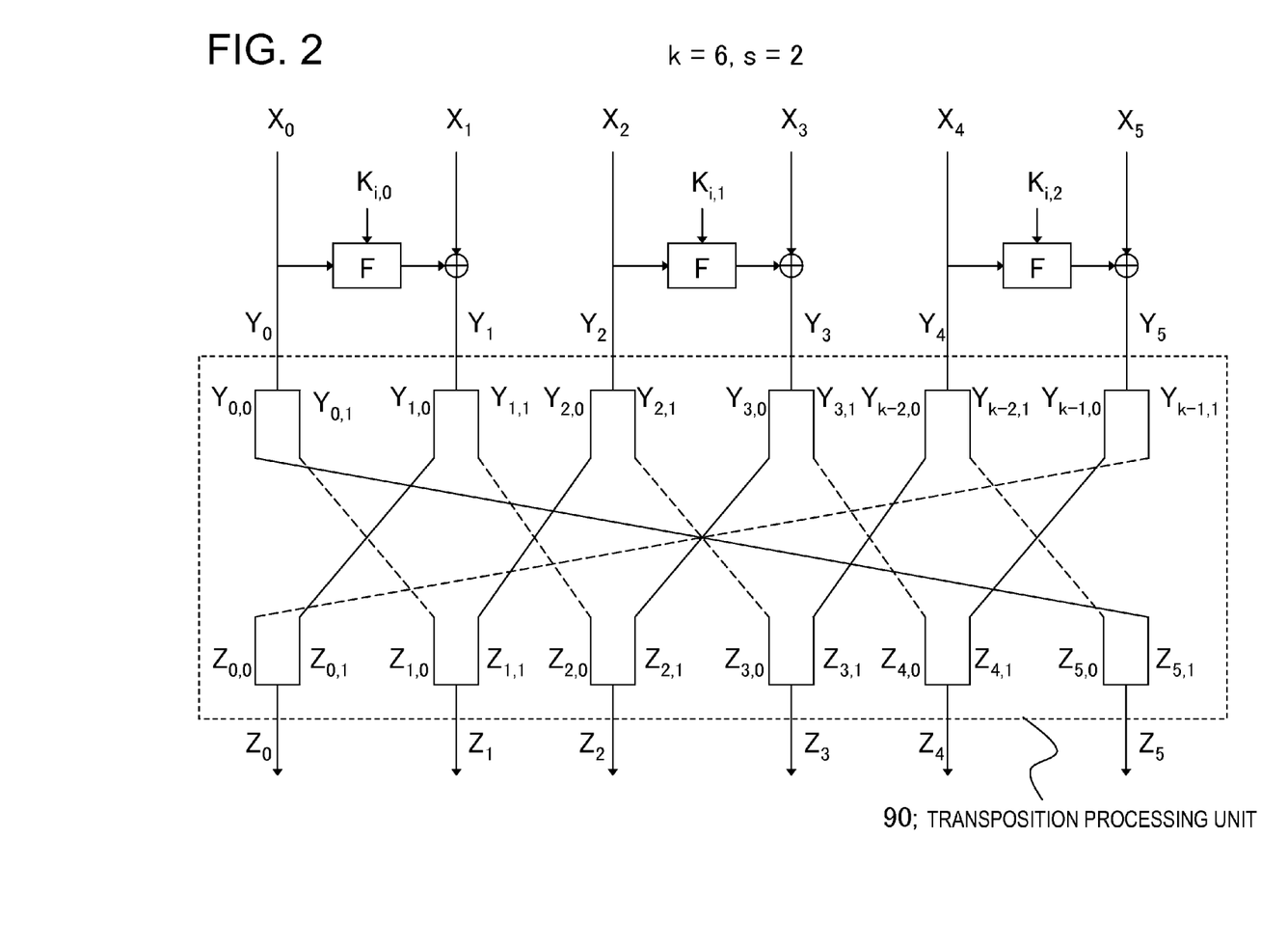
FIG. 2 is a drawing showing an example of transposition processing of a first exemplary embodiment.

In FIG. 2, the transposition processing of the present disclosure is applied to a six-partition generalized Feistel structure (corresponding to one round). In the present exemplary embodiment, the transposition processing unit 104 in FIG. 1 comprises a transposition processing unit 90 in FIG. 2.

Input data entered into the transposition processing unit 90 is $Y_0, Y_1, \ldots, Y_5$, and output data therefrom is $Z_0, Z_1, \ldots, Z_5$. Further, data obtained by dividing $Y_i$ into 2 blocks is $Y_{i,\,0}, Y_{i,\,1}$, and data obtained by dividing $Z_i$ into 2 blocks is $Z_{i,\,0}, Z_{i,\,1}$.

Transposition processing P1 and transposition processing Q1 are as follows.

P1≡(p1[0], p1[1], p1[2], p1[3], p1[4], p1[5])=(5, 0, 1, 2, 3, 4)
Q1≡(q1[0], q1[1], q1[2], q1[3], q1[4], q1[5])=(1, 2, 3, 4, 5, 0)

Here, $Y_{i,\,0}$ is transposed into $Z_{p1[i],\,1}$, and $Y_{i,\,1}$ is transposed into $Z_{q1[i],\,0}$. For instance, when i=0, $Y_{0,\,0}$ is transposed into $Z_{5,\,1}$, and $Y_{5,\,1}$ is transposed into $Z_{0,\,0}$.

In the transposition processing unit 90 in FIG. 2, solid lines correspond to the transposition processing P1 and dashed lines correspond to the transposition processing Q1.

The data conversion unit 53 of the encryption processing device 70 shown in FIG. 10 requires the transposition processing unit 83 for encryption and the transposition processing unit 84 for decryption as shown in FIG. 11, and it further requires the selector 85 for selecting the outputs thereof.

Meanwhile, in the data conversion unit 100 of the present exemplary embodiment, encryption and decryption processes can share the transposition processing unit 104. Therefore, the data conversion unit 100 does not require a selector corresponding to the selector 85 in FIG. 11. Neither does the data conversion unit 100 require a signal for switching that corresponds to the encryption/decryption signal in FIG. 11.

Further, the present exemplary embodiment can be applied to any division number (even number) k. The configuration of the present exemplary embodiment for any division number k is as follows. The encryption processing device of the present exemplary embodiment comprises the following transposition processing unit 104 as a transposition processing unit having a k-partition generalized Feistel structure. Input data entered into the transposition processing unit 104 is $Y_0, Y_1, \ldots, Y_{k-1}$ (n bits×k), and output data from the transposition processing unit 104 is $Z_0, Z_1, \ldots, Z_{k-1}$. Further, $Y_i$ (i=0, 1, ..., k−1) divided into s blocks (s=2, 4, ..., n) is $Y_{i,\,0}, Y_{i,\,1}, \ldots, Y_{i,\,s-1}$. Similarly, $Z_i$ divided into s blocks is $Z_{i,\,0}, Z_{i,\,1}, \ldots, Z_{i,\,s-1}$. At this time, the transposition processing unit 104 transposes $Y_{b,u}$ into $Z_{a,t}$ when $Y_{a,t}$ (t=0, 1, ..., s−1) is transposed into $Z_{b,u}$ (u=0, 1, ..., s−1, u≠t).

In a hardware implementation, the transposition processing unit 104 is simply a wiring(s). Therefore, any change made on the connection source and destination will not affect the implementation scale. By performing transposition processing of a generalized Feistel structure using the transposition processing unit 104 of the present exemplary embodiment, the transposition processing unit 104 can be shared by encryption and decryption processes. As a result, the selector for switching transposition processing required in a generalized Feistel structure that performs transposition with divided data sizes becomes unnecessary. Therefore, according to the encryption processing device relating to the present exemplary embodiment, the scale of hardware implementation can be decreased.

(Second Exemplary Embodiment)

Next, an encryption processing device relating to a second exemplary embodiment will be described with reference to the drawings. As in the first exemplary embodiment, the configuration of the entire encryption processing device in the present exemplary embodiment is also the same as the block diagram shown in FIG. 8 as an example. Further, in the present exemplary embodiment, the data conversion unit 52 in the encryption processing device 50 in FIG. 8 is also the data conversion unit 100 shown in FIG. 1.

Figure 3:
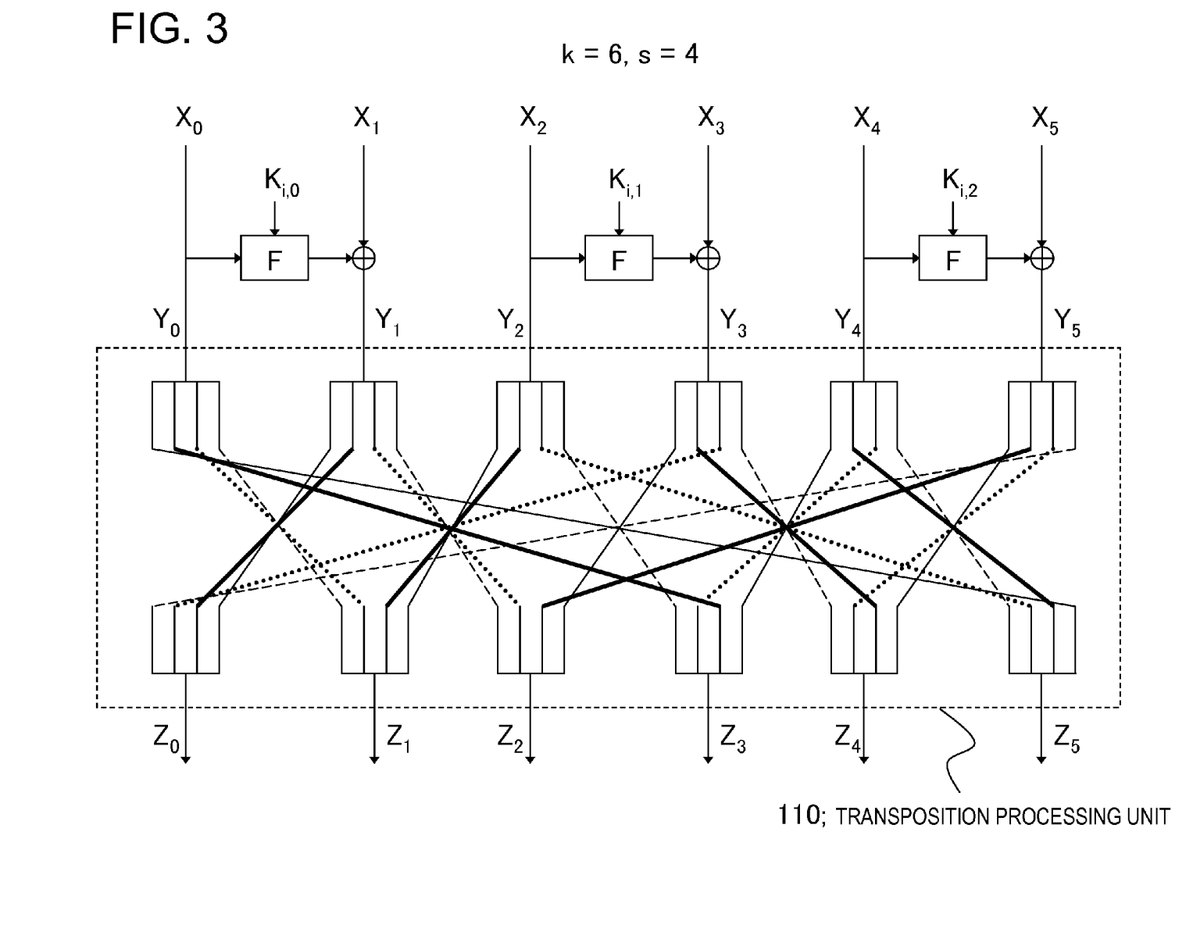
FIG. 3 is a drawing showing an example of a transposition process of a second exemplary embodiment.

FIG. 3 is a drawing showing a configuration of a transposition processing unit 110 in the present exemplary embodiment. In the present exemplary embodiment, the transposition processing unit 104 in FIG. 1 comprises the transposition processing unit 110 in FIG. 3.

With reference to FIG. 3, the transposition processing unit 110 in the present exemplary embodiment differs from the transposition processing unit 90 in the first exemplary embodiment shown in FIG. 2 in that each of six pieces of input data $Y_i$ and output data $Z_i$ to/from the transposition processing unit 110 is divided into four blocks.

With reference to FIG. 2, in the first exemplary embodiment, each of the input/output data $Y_i$ and $Z_i$ is divided into two blocks, and the transposition processing P and its inverse transposition processing Q are combined. Meanwhile, with reference to FIG. 3, four kinds of processing: the transposition processing P1, its inverse transposition processing Q1, transposition processing P2, and its inverse transposition processing Q2, are combined in the present exemplary embodiment.

$Y_i$ is divided into four blocks: $Y_{i,0}$, $Y_{i,1}$, $Y_{i,2}$, and $Y_{i,3}$. Similarly, $Z_i$ is divided into four blocks: $Z_{i,0}$, $Z_{i,1}$, $Z_{i,2}$, and $Z_{i,3}$.

In this case, $Y_{i,t}$ is transposed into $Z_{p1[t],u}$; $Y_{i,v}$ is transposed into $Z_{p2[t],w}$; $Y_{i,w}$ is transposed into $Z_{q2[t],v}$; and $Y_{i,u}$ is transposed into $Z_{q1[t],t}$.

The transposition processing P1, Q1, P2, and Q2 by the transposition processing unit 110 in FIG. 3 are as follows.

P1 ≡(p1[0], p1[1], p1[2], p1[3], p1[4], p1[5])=(5, 0, 1, 2, 3, 4)
Q1≡(q1[0], q1[1], q1[2], q1[3], q1[4], q1[5])=(1, 2, 3, 4, 5, 0)
P2≡(p2[0], p2[1], p2[2], p2[3], p2[4], p2[5])=(3, 0, 1, 4, 5, 2)
Q2≡(q2[0], q2[1], q2[2], q2[3], q2[4], q2[5])=(1, 2, 5, 0, 3, 4)

Further, t=0, u=3, v=1, and w=2, however, other combinations are possible.

In the transposition processing unit 110 in FIG. 3, thin solid lines correspond to the transposition processing P1; thick solid lines correspond to the transposition processing P2; dashed lines correspond to the transposition processing Q1; and dotted lines correspond to Q2.

The disclosures of the above Patent Literature and Non-Patent Literature are incorporated herein by reference thereto. Modifications and adjustments of the exemplary embodiments are possible within the scope of the overall disclosure (including the claims) of the present invention and based on the basic technical concept of the present invention. Various combinations and selections of various disclosed elements (including each element of each claim, each element of each exemplary embodiment, each element of each drawing, etc.) are possible within the scope of the claims of the present invention. That is, the present invention of course includes various variations and modifications that could be made by those skilled in the art according to the overall disclosure including the claims and the technical concept. Particularly, any numerical range disclosed herein should be interpreted that any intermediate values or subranges falling within the disclosed range are also concretely disclosed even without specific recital thereof.

The present invention can be applied to a use such as concealment of communication data for a voice communication terminal or a data communication apparatus and encryption of stored data in a storage.

REFERENCE SIGNS LIST 10, 30, 62, 82, 103: F function processing unit
11, 31, 40, 63, 83, 84, 90, 104, 110: transposition processing unit
50, 70: encryption processing device
51: expanded key generation unit
52, 53, 100: data conversion unit
60, 64, 80, 85, 86, 101, 105: selector
61, 81, 102: register
C: encrypted text
P: plain text

The invention claimed is:

1. An encryption processing device, comprising:
an F function processing unit that divides (m×k)-bit input data into k blocks (m and k are both even numbers) of m-bit word (referred to as "word" hereinafter) x0, x1, ..., xk−2, xk−1, and that outputs as a word Yi+1 (i=0, 2, ..., k−2) a word obtained as a result of an operation between the word xi+1 and a result of an operation of an F-function using key data on the word xi, while outputting the word xi as a word Yi; and
a transposition processing unit that divides the word Yi (i=0, 1, ..., k−1) into s blocks (s=2, 4, ..., m) of sub-words Yi,0, Yi,1, ..., Yi, s−1, transposes a sub-word Yi, w[x] into a sub-word Zpx[i], w[y] with a transposition condition Px (x=1, 2, ..., s/2−1) and a transposition condition Qx (x=1, 2, ..., s/2−1), transposes a sub-word Yi, w[y] into a sub-word Zqx[i], w[x], and that outputs a word Zi, 0 Zi, 1...Zi, s−1 as an i-th word, wherein
the transposition condition Px=(px[0], px[1], px[2], ..., px[k−1]) transposes an i-th sub-word into a px[i]-th sub-word where px[i]≠px[j] if i≠j,
the transposition condition Qx=(qx[0], qx[1], qx[2], ..., qx[k−1]) transposes an i-th sub-word into a qx[i]-th sub-word where qx[i]≠qx[j] if i≠j,
qx[px[i]]=i, and
the w[t](t=0, 1, ..., s−1) is w[t]∈{0, 1, 2, ..., s−1} where w[t]≠w[T] if t≠T.

2. The encryption processing device according to claim 1, further comprising:
an F function processing unit that divides (m×k)-bit input data into k blocks (m and k are both even numbers) of m-bit word (referred to as "word" hereinafter) x0, x1, ..., xk−2, xk−1, and that outputs as a word Yi+1 (i=0, 2, ..., k−2) a word obtained as a result of an operation between the word $x_{i+1}$ and a result of an operation of an F function using key data on the word $x_i$ while outputting the word $x_i$ as a word $Y_i$.

3. The encryption processing device according to claim 1, wherein
the encryption processing device is configured to encrypt or decrypt $(m \times k)$-bit data by repeating a predetermined number of rounds of supplying an $(m \times k)$-bit plain text or encrypted text to the F function processing unit, supplying an output thereof to the transposition processing unit, and supplying an output thereof to the F function processing unit again, finally performing F function processing, and by deeming an output thereof as an encrypted text or a plain text.

4. The encryption processing device according to claim 3, further comprising:
a first selector that receives outputs from the F function processing unit and the transposition processing unit, selects and outputs an output from the transposition processing unit while the predetermined number of rounds are repeated, and that selects and outputs an output from the F function processing unit at all other times; and
a second selector that receives the plain text or encrypted text and an output from the first selector, selects and outputs the plain text or encrypted text before the repetition of the predetermined number of rounds starts, and that selects and outputs an output from the first selector at all other times, wherein
the F function processing unit receives an output from the second selector.

5. A computer-implemented encryption processing method, comprising:
dividing $(m \times k)$-bit input data into k blocks (m and k are both even numbers) of m-bit word (referred to as "word" hereinafter) $x_0, x_1, \ldots, x_{k-2}, x_{k-1}$, and obtaining as a word $Y_{i+1}$ ($i=0, 2, \ldots, k-2$) a word obtained as an operation between the word $x_{i+1}$ and a result of an operation of an F function using key data on the word $x_i$, while deeming the word $x_i$ as a word $Y_i$; and
dividing the word $Y_i$ ($i=0, 1, \ldots, k-1$) into s blocks ($s=2, 4, \ldots, m$) of sub-words $Y_i, 0, Y_i, 1, \ldots, Y_i, s-1$, transposing a sub-word $Y_i, w[x]$ into a sub-word $Z_{px[i]}, w[y]$ with a transposition condition Px ($x=1, 2, \ldots, s/2-1$) and a transposition condition Qx ($x=1, 2, \ldots, s/2-1$), transposing a sub-word $Y_i, w[y]$ into a sub-word $Z_{qx[i]}, w[x]$, and deeming a word $Z_i, 0 Z_i, 1 \ldots Z_i, s-1$ as an i-th word,
wherein
the transposition condition $Px=(px[0], px[1], px[2], \ldots, px[k-1])$ transposes an i-th sub-word into a px[i]-th sub-word where $px[i] \neq px[j]$ if $i \neq j$,
the transposition condition $Qx=(qx[0], qx[1], qx[2], \ldots, qx[k-1])$ transposes an i-th sub-word into a qx[i]-th sub-word where $qx[i] \neq qx[j]$ if $i \neq j$,
$qx[px[i]]=i$, and
the $w[t]$ ($t=0, 1, \ldots, s-1$) is $w[t] \in \{0, 1, 2, \ldots, s-1\}$ where $w[t] \neq w[T]$ if $t \neq T$.

6. An encryption processing device, comprising:
an F function processing means that divides $(m \times k)$-bit input data into k blocks (m and k are both even numbers) of m-bit word (referred to as "word" hereinafter) $x_0, x_1, \ldots, x_{k-2}, x_{k-1}$, and that outputs as a word $Y_{i+1}$ ($i=0, 2, \ldots, k-2$) a word obtained as a result of an operation between the word $x_{i+1}$ and a result of an operation of an F-function using key data on the word $x_i$, while outputting the word $x_i$ as a word $Y_i$; and
a transposition processing means that divides the word $Y_i$ ($i=0, 1, \ldots, k-1$) into s blocks ($s=2, 4, \ldots, m$) of sub-words $Y_i, 0, Y_i, 1, \ldots, Y_i, s-1$, transposes a sub-word $Y_i, w[x]$ into a sub-word $Z_{px[i]}, w[y]$ with a transposition condition Px ($x=1, 2, \ldots, s/2-1$) and a transposition condition Qx ($x=1, 2, \ldots, s/2-1$), transposes a sub-word $Y_i, w[y]$ into a sub-word $Z_{qx[i]}, w[x]$, and that outputs a word $Z_i, 0 Z_i, 1 \ldots Z_i, s-1$ as an i-th word,
wherein the transposition condition $Px=(px[0], px[1], px[2], \ldots, px[k-1])$ transposes an i-th sub-word into a px[i]-th sub-word where $px[i] \neq px[j]$ if $i \neq j$,
wherein the transposition condition $Qx=(qx[0], qx[1], qx[2], \ldots, qx[k-1])$ transposes an i-th sub-word into a qx[i]-th sub-word where $qx[i] \neq qx[j]$ if $i \neq j$,
wherein $qx[px[i]]=i$, and
wherein the $w[t]$ ($t=0, 1, \ldots, s-1$) is $w[t] \in \{0, 1, 2, \ldots, s-1\}$ where $w[t] \neq w[T]$ if $t \neq T$.

7. The encryption processing device according to claim 6, wherein the encryption processing device is configured to encrypt or decrypt $(m \times k)$-bit data by repeating a predetermined number of rounds of supplying an $(m \times k)$-bit plain text or encrypted text to the F function processing means, supplying an output thereof to the transposition processing means, and supplying an output thereof to the F function processing means again, finally performing F function processing, and by deeming an output thereof as an encrypted text or a plain text.

8. The encryption processing device according to claim 7, further comprising:
a first selecting means that receives outputs from the F function processing means and the transposition processing means, selects and outputs an output from the transposition processing means while the predetermined number of rounds are repeated, and that selects and outputs an output from the F function processing means at all other times; and
a second selecting means that receives the plain text or encrypted text and an output from the first selecting means, selects and outputs the plain text or encrypted text before the repetition of the predetermined number of rounds starts, and that selects and outputs an output from the first selecting means at all other times,
wherein the F function processing means receives an output from the second selecting means.

* * * * *

UNITED STATES PATENT AND TRADEMARK OFFICE
CERTIFICATE OF CORRECTION

PATENT NO. : 9,124,420 B2
APPLICATION NO. : 13/883693
DATED : September 1, 2015
INVENTOR(S) : Tomoyasu Suzaki and Yukiyasu Tsunoo It is certified that error appears in the above-identified patent and that said Letters Patent is hereby corrected as shown below:

In the Specification

Column 5, Line 5: Delete "w[t]" and insert -- w[t] $\neq$ -- (Third Occurrence)

Signed and Sealed this
Fifteenth Day of March, 2016

Michelle K. Lee
*Director of the United States Patent and Trademark Office*